Aug. 17, 1965 F. ZENDEH 3,201,783
SELF-CORRECTING CODING CIRCUIT, AND CIRCUIT ARRANGEMENT FOR DECODING BINARY INFORMATION
Filed Aug. 6, 1963 7 Sheets-Sheet 1

INVENTOR
FARHANG ZENDEH
BY Percy P. Lantzy
ATTORNEY

Aug. 17, 1965 F. ZENDEH 3,201,783
SELF-CORRECTING CODING CIRCUIT, AND CIRCUIT ARRANGEMENT FOR DECODING BINARY INFORMATION
Filed Aug. 6, 1963 7 Sheets-Sheet 2

INVENTOR
FARHANG ZENDEH

BY Percy P. Lantzy
ATTORNEY

Aug. 17, 1965 F. ZENDEH 3,201,783

SELF-CORRECTING CODING CIRCUIT, AND CIRCUIT ARRANGEMENT FOR DECODING BINARY INFORMATION

Filed Aug. 6, 1963 7 Sheets-Sheet 3

INVENTOR
FARHANG ZENDEH
BY Percy P. Lantzy
ATTORNEY

Aug. 17, 1965 F. ZENDEH 3,201,783

SELF-CORRECTING CODING CIRCUIT, AND CIRCUIT ARRANGEMENT FOR DECODING BINARY INFORMATION

Filed Aug. 6, 1963 7 Sheets-Sheet 4

INVENTOR
FARHANG ZENDEH

BY Percy P. Lantzy
ATTORNEY

INVENTOR
FARHANG ZENDEH
BY Percy P. Lantzy
ATTORNEY

INVENTOR
FARHANG ZENDEH

BY Percy P. Lantzy
ATTORNEY

INVENTOR
FARHANG ZENDEH
BY [signature]
ATTORNEY

United States Patent Office 3,201,783

Patented Aug. 17, 1965

3,201,783

SELF-CORRECTING CODING CIRCUIT, AND CIRCUIT ARRANGEMENT FOR DECODING BINARY INFORMATION

Farhang Zendeh, Kornwestheim, Wurttemberg, Germany, assignor to International Standard Electric Corporation, New York, N.Y., a corporation of Delaware Filed Aug. 6, 1963, Ser. No. 300,307
Claims priority, application Germany, Nov. 27, 1962, St 20,004
2 Claims. (Cl. 340—347)

Figure 1:
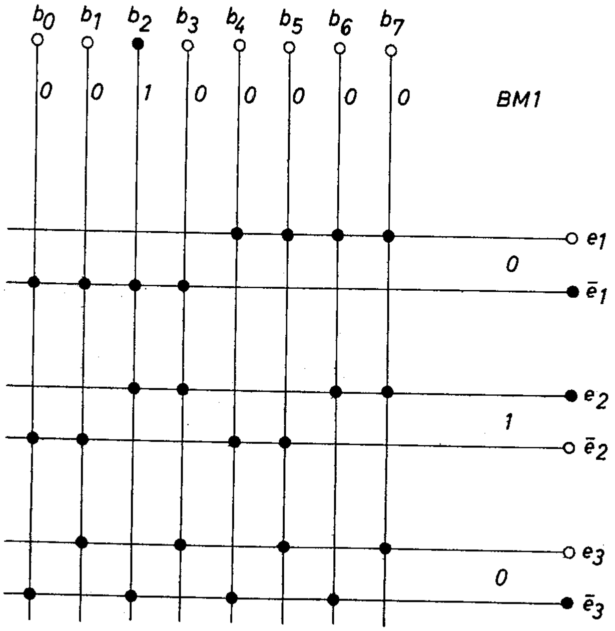

The present invention relates to a self-correcting coding circuit for encoding information into any arbitrary code, and to a circuit arrangement for converting any arbitrary code into another arbitrary code.

Translators, in particular encoding circuits, are known in which, at the individual connecting points, there are not provided the otherwise customary diodes, magnetic cores, etc., but linear admittances (ohmic resistors). But these translators have the same disadvantage as the conventional types of circuits, namely that in the case of a failure of one connecting point, the connection is no longer effected unobjectionably. On account of this it is possible that faulty signals will appear at the output.

Moreover, self-correcting decoding circuits are known in which the failure of one or more connecting elements has no impairing effect upon the function ability of this circuit. These types of decoding circuits consist of the series connection of a so-called signification matrix and of a so-called test matrix. The output leads of the test matrix are connected to a maximum detection circuit which then, in accordance with the stored code, will mark one of its outputs.

This conventional type of circuit arrangement for decoding binary-encoded information, however, is not, without further ado, suitable for performing a coding. For this reason the present invention proposes a self-correcting coding circuit for the encoding of information in any arbitrary binary code with the aid of a test matrix and a signification matrix employing linear admittances at their points of intersection. This arrangement is characterised by the fact that the information to be encoded is capable of being fed to the input leads of the test matrix, that the output leads of the test matrix are directly connected to the input leads of the signification matrix, and that the output leads of the signification matrix are connected either in pairs to maximum detection circuits, or individually to a threshold-value circuit, from the outputs of which there may be taken the desired code.

According to a further embodiment of the subject matter of the present invention, only those of the intersecting points of the test matrix are connected, whose admittance units have a value beyond a predetermined value. Moreover, it is possible to connect only the admittances of the test matrix lying above the predetermined value, by an admittance, and those lying below that value, by no admittance.

If there is to be produced an output code in which there will appear not all of the $2^n$ code words of $n$ variables, then, in accordance with a further embodiment of the invention, the signification matrix is not set-up in accordance with the desired, but in accordance with the complete code. However, if the code to be produced is a balanced (equilibrium) code, then the signification matrix may be set-up in accordance with the desired code.

According to a still further embodiment of the invention it is possible to build up from a self-correcting decoding circuit of the type known per se, and from a self-correcting coding circuit according to the invention, a self-correcting translator circuit for converting any suitable code into any other suitable code. According to this further embodiment of the invention the output of the decoding circuit is connected to the input of the coding circuit, so that this entire combination will act as a self-correcting translator.

Figure 2A:
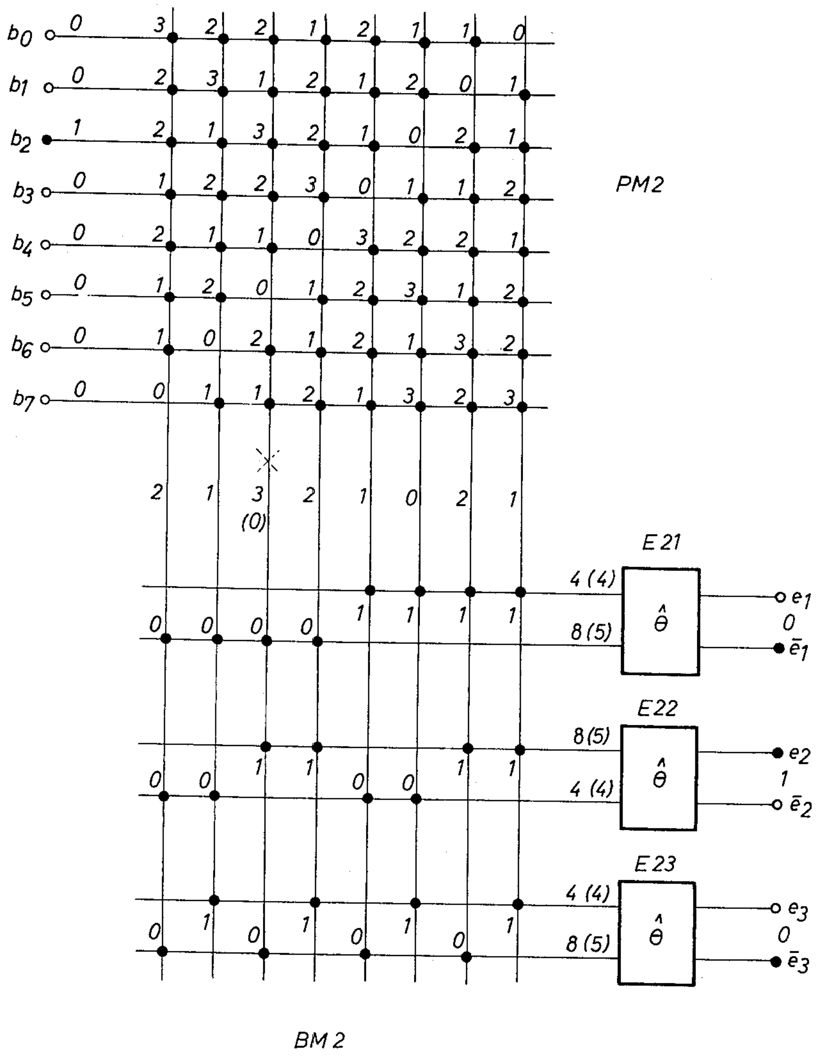
Figure 2B:
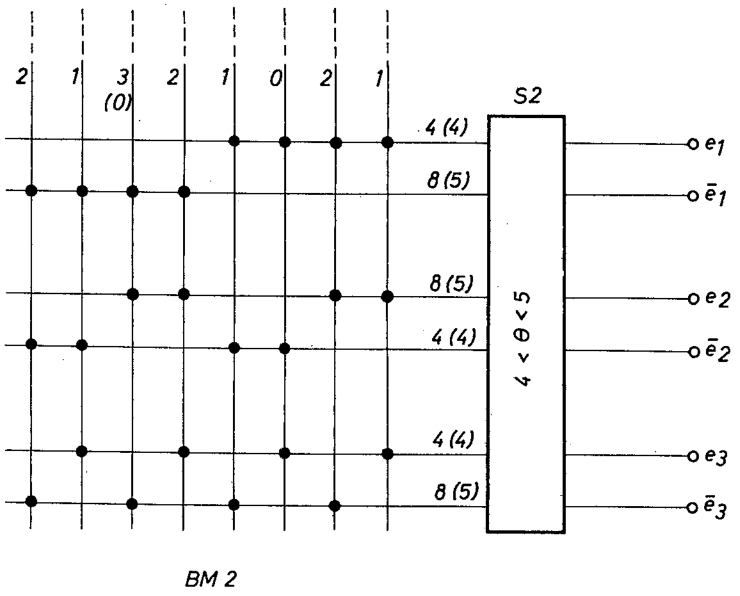
Figure 7:
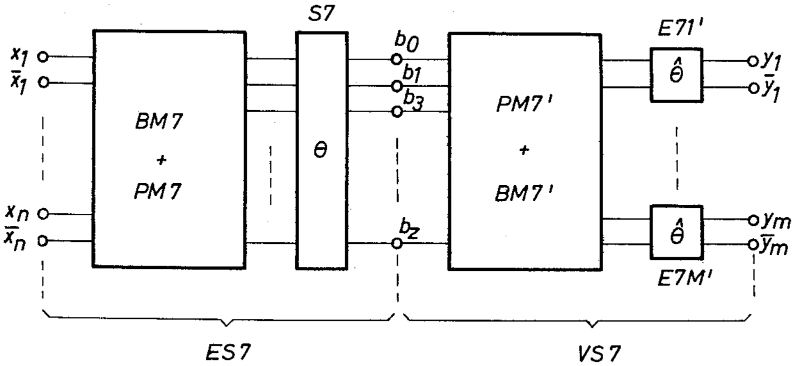
Figure 3:
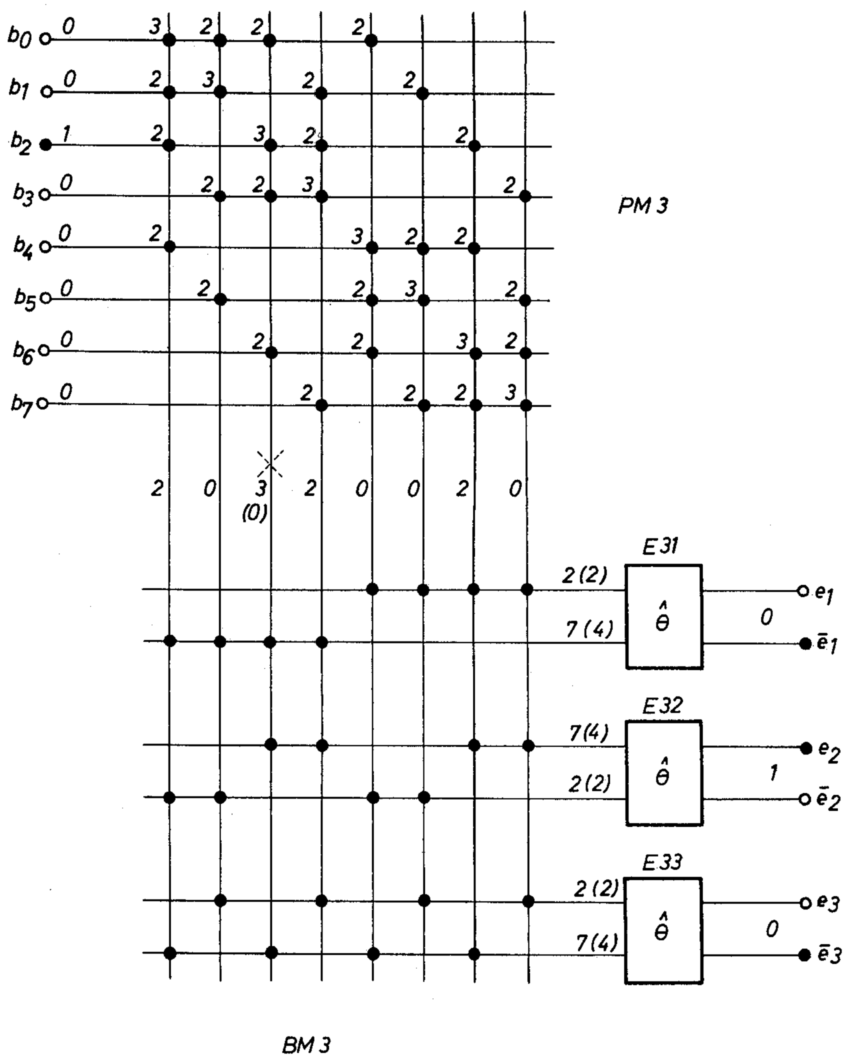
Figure 4:
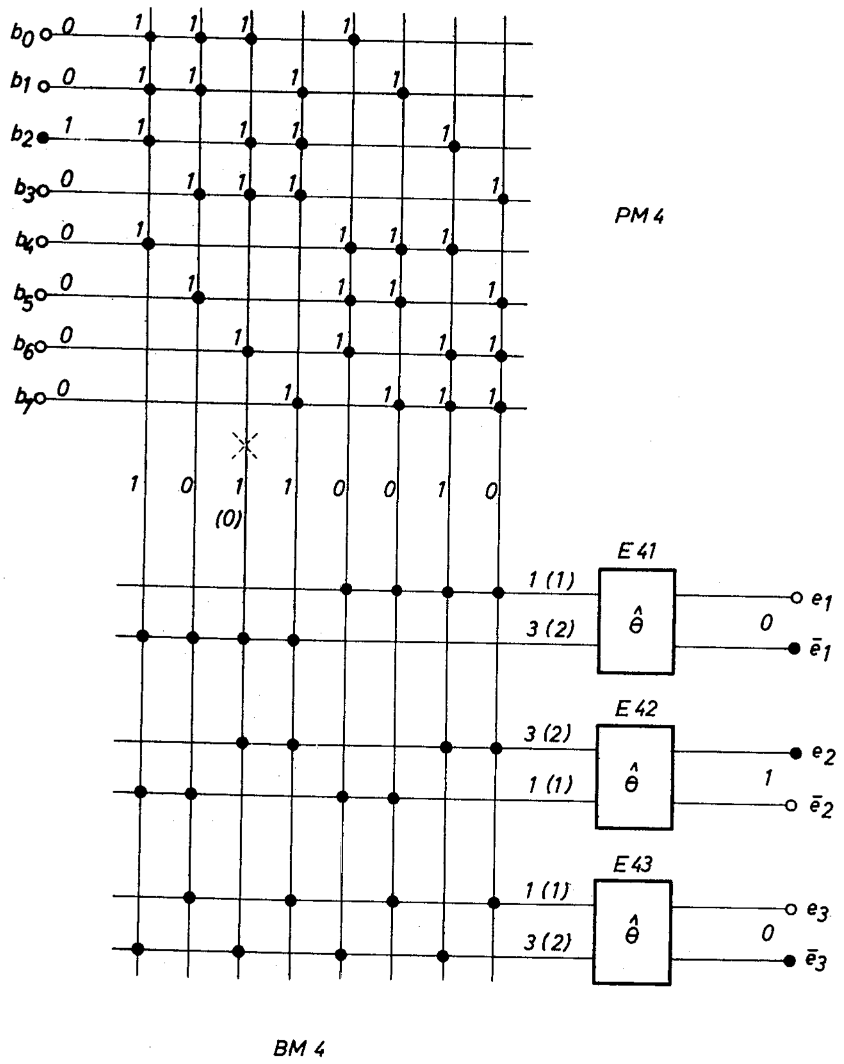
Figure 5:
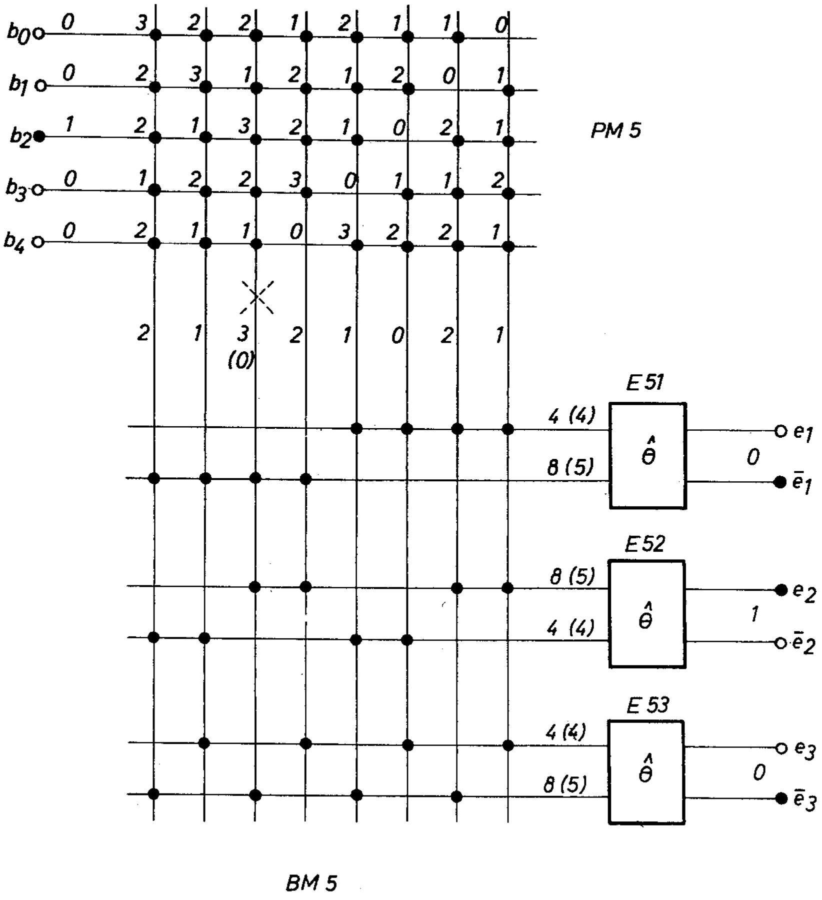
Figure 6:
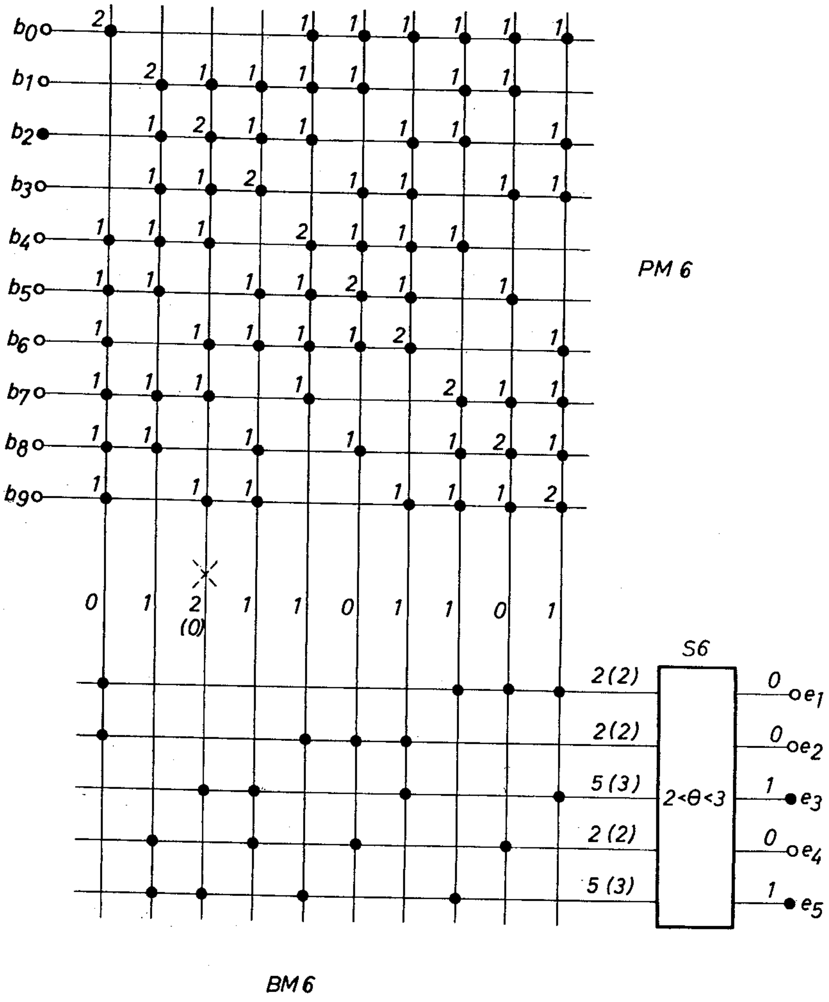

The invention will now be explained in detail with reference to FIGS. 1–7 of the accompanying drawings, in which:

FIG. 1 shows a conventional type of coding circuit,

FIG. 2*a* shows the circuit arrangement according to the invention comprising several maximum detection circuits at the ouput, FIG. 2*b* shows a circuit arrangement resembling that shown in FIG. 2*a*, but employing a threshold-value circuit at the output, FIG. 3 shows a circuit arrangement employing a simplified type of test matrix, FIG. 4 shows a further circuit arrangement comprising a simplified type of test matrix, FIG. 5 shows a circuit arrangement for output codes, in which there are contained not all code words of the complete code, FIG. 6 shows a circuit arrangement for a balanced (equilibrium) code, and FIG. 7 shows a translator circuit for converting any arbitrary code into another arbitrary code.

Referring now to FIG. 1, there is shown a coding circuit (signification matrix) BM1 comprising eight inputs (columns) $b_0 \ldots b_7$ and three output pairs (rows) $e_1 \ldots \bar{e}_3$. The outputs are of a contradictory design in order that the individual columns as well as the individual rows will each time comprise the same number of connecting points.

For example, if now the input lead $b_2$ is marked then, via the corresponding connecting elements (ohmic resistors), there is effected the marking of the output leads $\bar{e}_1$ $e_2$ and $\bar{e}_3$. These output markings correspond to the code 010. However, if some of the connecting points should happen to fail on account of an interruption, then there will no longer be ensured an unobjectionable encoding of the fed-in information.

FIG. 2*a* shows the inventive type of coding circuit consisting of a test matrix PM2, of a signification matrix BM2, and of three maximum detection circuits E21, E22 and E23. In this case the signification matrix BM2 is again designed exactly like the signification matrix BM1 in FIG. 1. The connecting points of each input lead (column) of the signification matrix BM2 are in this case assigned to the code word corresponding to this particular significance, as is indicated by the figures 0 or 1 respectively. The output leads (rows) are connected in pairs with each time one maximum detection circuit E21, E22 and E23, at the output leads $e_1 \ldots \bar{e}_3$ of which there may be taken off the desired code. Quite depending on which of the two input leads of each maximum detection circuit shows the higher marking, it will be decided which of the associated output leads will be marked.

The signification matrix BM2 is preceded by a test matrix PM2 of the type known per se. The signal to be coded is fed into the eight input leads $b_0 \ldots b_7$ (rows). The output leads (columns) of the test matrix are connected to the input leads (columns) of the signification matrix. At the points of intersection of the test matrix there are arranged several admittances with the units 1, 2 and 3. The absence of an admittance is indicated or denoted by a 0. The connecting scheme of the test matrix PM2 corresponds to the similarity matrix of the code to be produced. The similarity matrix will be obtained when writing down the binary code to be produced, in the mathematical sense as a matrix, and when multiplying it with the transponents thereof. This matrix multiplication may be taken from the following table.

*Table 1*

| | | | | |
|---|---|---|---|---|
| 0 1 0 1 0 1 | | 0 0 0 0 1 1 1 1 | | 3 2 2 1 2 1 1 0 |
| 0 1 0 1 1 0 | | 1 1 1 1 0 0 0 0 | | 2 3 1 2 1 2 0 1 |
| 0 1 1 0 0 1 | | 0 0 1 1 0 0 1 1 | | 2 1 3 2 1 0 2 1 |
| 0 1 1 0 1 0 | ⊙ | 1 1 0 0 1 1 0 0 | = | 1 2 2 3 0 1 1 2 |
| 1 0 0 1 0 1 | | 0 1 0 1 0 1 0 1 | | 2 1 1 0 3 2 2 1 |
| 1 0 0 1 1 0 | | 1 0 1 0 1 0 1 0 | | 1 2 0 1 2 3 1 2 |
| 1 0 1 0 0 1 | | | | 1 0 2 1 2 1 3 2 |
| 1 0 1 0 1 0 | | | | 0 1 1 2 1 2 2 3 |

The result shown on the right-hand side is the similarity matrix for the code to be produced. According to the scheme of this matrix the individual admittances are inserted at the points of intersection of the test matrix PM2.

If now there is marked e.g. the input lead $b_2$, then the values 21321021 as inserted in FIG. 2*a* will result at the output of the test matrix (columns). These values correspond to the admittance units of the marked row $b_2$ of the test matrix, and will energize the output leads (rows) via the connecting elements of the signification matrix BM2. In the case of the inserted or shown markings of the rows the maximum detection circuits E21, E22 and E23 will now be capable of reliably determining which of the output leads $e_1 \ldots \bar{e}_3$ have to be marked.

In the event of a failure of e.g. the third column of the test matrix PM2, that is, the column with the most excitations (denoted by the interruption indicated by the dashed-cross), then this column will transfer the excitation 0 to the signification matrix BM2. On account of this failure there will result at the rows (output) of the signification matrix the excitation values as shown in brackets. It will be seen that the excitations of each pair of rows will still always differ by the value 1, so that the maximum detection circuits will be capable of unobjectionably marking the output leads.

Instead of the maximum detection circuits E21, E22 and E23 it is also possible to provide, in accordance with the showing of FIG. 2*b*, a threshold circuit S2. In this exemplified embodiment the threshold must be lying between the values 4 and 5, e.g. at 4, 5. This means to imply that the output leads $e_1 \ldots \bar{e}_3$ will only be marked if the input excitations are above the value of 4, 5.

FIG. 3 shows a further embodiment according to the invention, in which the test matrix is of a simplified design. In this test matrix PM3 there have been omitted all admittances lying below the value 2, that is, the admittances 1. By employing this measure it will be possible to achieve a saving of connecting elements. The excitation values appearing at the output leads (columns) of the test matrix PM3 are sufficient for unobjectionably determining the output leads to be marked also in the event of a failure of one row. This is shown by the excitation values indicated at the rows of the signification matrix BM3.

Table 2 shows, with respect to differently large coding circuits, and in dependence upon the predetermined value from whereon the connecting elements are omitted, the number Z of the correctable row failures within the signification matrix. In this case *n* indicates the number of bits existing in the code to be produced, and $\theta_1$ indicates the predetermined value.

*Table 2*

| n \ $\theta_1$ | 1 | 2 | 3 | 4 | 5 | 6 | 7 | 8 | 9 | 10 |
|---|---|---|---|---|---|---|---|---|---|---|
| 3 | 1 | 1 | 0 | Z=number of correctable column failures | | | | | | |
| 4 | 2 | 2 | 2 | 0 | | | | | | |
| 5 | 3 | 4 | 5 | 3 | 0 | | | | | |
| 6 | 6 | 6 | 9 | 9 | 4 | 0 | | | | |
| 7 | 11 | 12 | 15 | 18 | 14 | 5 | 0 | | | |
| 8 | 19 | 20 | 25 | 33 | 33 | 20 | 6 | 0 | | |
| 9 | 35 | 36 | 42 | 56 | 65 | 54 | 27 | 7 | 0 | |
| 10 | 64 | 66 | 73 | 94 | 118 | 118 | 82 | 35 | 8 | 0 |

Accordingly, it is shown in Table 2 that in the case of a certain predetermined value $\theta_1$ there will result for each number *n* a maximum of correctable row failures Z.

FIG. 4 shows a further simplification of the circuit arrangement according to FIG. 3. All admittances existing at the points of intersection of the test matrix PM3, are replaced in the test matrix PM4 by one admittance unit. It may be taken from the excitation values that also in the event of a failure of one column, there is still possible to be carried out an unobjectionable discrimination with the aid of the maximum detection circuits E41, E42 and E43.

FIG. 5 shows a circuit arrangement for coding binary information into an output code in which there do not appear all $2^n$ code words out of *n* variables. When comparing the circuit arrangement according to FIG. 5 with the circuit arrangement according to FIG. 2*a*, it will be seen that the only difference between both arrangements resides in the fact that the last three rows of the test matrix PM2 are missing in the test matrix PM5. The signification matrices BM2 and BM5 are of the same design, as are the maximum detection circuits. Accordingly, the signification matrix is not composed or set-up in accordance with the desired incomplete code, but in accordance with the complete code. Accordingly, the matrices PM5 and BM5 consist of the same number of columns; this number is tailored to the complete code.

The signification matrix does not need to be laid out for the complete code in cases where there is not a complete, but a balanced (equilibrium) code. Relative thereto there will first of all be defined the expression balanced (equilibrium) code.

Each code comprising *n* variables enables $2^n$ different code words; these are composed of the following groups:

$\binom{n}{0}$ code words (0-out-of-*n*) code
$\binom{n}{1}$ code words (1-out-of-*n*) code
$\binom{n}{2}$ code words (2-out-of-*n*) code
⋮
$\binom{n}{n-1}$ code words (*n*-1-out-of-*n*) code
$\binom{n}{n}$ code words (*n*-out-of-*n*) code e.g. with respect to our example with $n=3$:

$\binom{3}{0}$=1 code word (0-out-of-3) code: 0 0 0
$\binom{3}{1}$=3 code words (1-out-of-3) code: 1 0 0
0 1 0
0 0 1
$\binom{3}{2}$=3 code words (2-out-of-3) code: 1 1 0
1 0 1
0 1 1
$\binom{3}{3}$=1 code word (3-out-of-3) code: 1 1 1

A complete code exists whenever, in our example of $n=3$, there exist all eight code words. A balanced or equilibrium code exists whenever in the code there exist one or more of these four groups as a whole.

The code is not a balanced or equilibrium code whenever the individual groups are not existent as a whole, for example in cases where from the second or third code group there are missing one or two code words in the code to be produced. In the circuit arrangement according to FIG. 5 there are missing, e.g. the last three code words 101, 011 and 111. Accordingly, ther are missing the last two code words of the third group, as well as the entire last group; accordingly, the third group is incomplete. A balanced or equilibrium code would exist e.g. if there would also be missing the first code word of the third group; in this case the signification matrix BM5 would only have to be laid out or designed for the desired code.

FIG. 6 now shows a coding circuit for effecting the coding into a 2-out-of-5 code. This 2-out-of-5 code is a balanced (equilibrium) code because it only contains the group (2-out-of-5). Accordingly, the signification matrix BM6 only need to be laid out for the desired code. If this code were not a balanced (equilibrium) code, then, in the case of five variables, the matrices PM6 and BM6 would each have to contain 32 columns which would then correspond to the complete code. If the desired code only contains one group, in this case the group (2-out-of-5), then, in addition thereto, the signification matrix BM6 would not have to be designed in a contradictory manner, because each code word contains an equal number of markings. In this case it is advisable to provide at the output of the signification matrix BM6 a threshold circuit S6 with a threshold $\theta$ lying between 2 and 3.

According to a further embodiment of the invention, a decoding circuit ES7 of the type known per se, and consisting of a signification matrix, may be combined with one of the inventive types of coding circuits VS7. This combination will then result in a self-correcting type of translator for converting any arbitrary code into another arbitrary code. The input leads are designated with $x_1 \ldots \overline{x}_n$, and the output leads with $y_1 \ldots \overline{y}_n$. The connecting points between the outputs of the decoding circuit ES7 and the inputs of the coding circuit VS7 are indicated, in accordance with their significance, by the references $b_0 \ldots b_z$.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A self-correcting circuit arrangement for coding information in any suitable binary code, said arrangement comprising a test matrix with coupling elements arranged at predetermined cross-points therein, the relative values of said coupling elements being determined as functions of the binary code to be produced; means for supplying to the input of said test matrix the information to be encoded; a signification matrix with coupling elements arranged at predetermined cross-points therein, said elements having values to produce the desired binary code, said signification matrix being coupled to the output of said test matrix and including $2^n$ input columns and $n$ double output rows, wherein "$n$" is equal to the number of variables; output means coupled to the output of said signification matrix for selecting which output leads of said output means are to be marked in accordance with the desired code; said test matrix including $2^n$ rows and columns and having relative values of coupling elements determined by multiplying in matrix form the binary code to be produced by the respective transponent thereof so as to alter the normal input to the signification matrix to preclude an improper marking as a result of a column failure.

2. A self-correcting circuit arrangement for coding information in any suitable binary code, said arrangement comprising a test matrix with coupling elements arranged at predetermined cross-points therein, the relative values of said coupling elements being determined as functions of the binary code to be produced; means for supplying to the input of said test matrix the information to be encoded; a signification matrix with coupling elements arranged at predetermined cross-points therein, said elements having values such as to produce the desired binary code, said signification matrix being coupled to the output of said test matrix and including $2^n$ input columns and $n$ double output rows, where "$n$" is the number of variables; output means coupled to the output of said signification matrix for selecting which output leads of said output means are to be marked in accordance with the desired code; said test matrix being adapted for less than the total possible number of code words, and including a predetermined number of columns and rows equivalent to the number of used code words, and said test matrix further having relative values of coupling elements determined by multiplying in matrix form the binary code to be produced by the respective transponent thereof so as to alter the normal input to the signification matrix to preclude an improper marking as a result of a column failure.

References Cited by the Examiner

UNITED STATES PATENTS

| | | | |
|---|---|---|---|
| 2,973,506 | 2/61 | Newby | 340—347 |
| 3,098,222 | 7/63 | Freedman | 340—347 |
| 3,099,004 | 7/63 | Heuer | 340—347 |

MALCOLM A. MORRISON, *Primary Examiner.*